United States Patent [19]

Zimmermann

[11] Patent Number: 4,768,664
[45] Date of Patent: Sep. 6, 1988

[54] INSULATING JUG HAVING AN ELASTIC SEAL

[75] Inventor: Anso Zimmermann, Niederaula, Fed. Rep. of Germany

[73] Assignee: Rotpunkt Dr. Anso Zimmermann, Niederaula, Fed. Rep. of Germany

[21] Appl. No.: 1,148

[22] Filed: Jan. 7, 1987

[30] Foreign Application Priority Data

Apr. 3, 1986 [DE] Fed. Rep. of Germany ....... 3611145

[51] Int. Cl.⁴ .................... A47J 41/00; B65D 39/08; B65D 53/02
[52] U.S. Cl. ................. 215/12.1; 215/13.1; 215/352; 215/356; 220/304
[58] Field of Search ............... 215/12 A, 13 R, 13 A, 215/356, 12.1, 12.2, 13.1; 220/304

[56] References Cited

U.S. PATENT DOCUMENTS

| 2,600,703 | 6/1952 | Strom | 220/304 X |
| 4,102,472 | 7/1978 | Sloan, Jr. | 220/304 X |
| 4,121,730 | 10/1978 | Dammer | 215/356 X |
| 4,460,104 | 7/1984 | Kitsukawa | 220/304 |
| 4,676,411 | 6/1987 | Simasaki | 215/13 R X |

FOREIGN PATENT DOCUMENTS

| 2461557 | 7/1976 | Fed. Rep. of Germany . |
| 3414429 | 10/1985 | Fed. Rep. of Germany . |
| 1427989 | 1/1966 | France . |
| 525272 | 8/1940 | United Kingdom ............... 220/304 |

Primary Examiner—William Price
Assistant Examiner—Sue A. Weaver
Attorney, Agent, or Firm—Scully, Scott, Murphy & Presser

[57] ABSTRACT

In an insulating jug (1) having a stopper (4) on which is arranged a sealing element (13) having a generally radially extending sealing lip (16) that in the closed position lies on a generally radially extedning sealing surface (19) on the housing (2) of the insulating jug (1), a reliable seal is attained even when there are relatively large discrepancies in the relative dimensions of the sealing parts. This is achieved through the bending stress of the sealing lip (16) being greater than the force extended on the sealing lip (16) by the fluid in the container, and by arranging a free space (23) on the side of the sealing lip (16) facing away from the sealing surface (19).

7 Claims, 1 Drawing Sheet

INSULATING JUG HAVING AN ELASTIC SEAL

TECHNICAL FIELD OF THE INVENTION

The invention relates to an insulating jug according to the preamble of claim 1.

BACKGROUND OF THE INVENTION AND PRIOR ART

In insulating jugs sealing between the stopper and the housing of the jug is generally effected by exerting pressure on the sealing element. In the case of insulating jugs with a recess at the top into which the stopper is inserted and from which a spout or a tube branches off to one side, the sealing element, comprising a sealing disc or sealing ring, is arranged on the underside of the stopper, and cooperates with the bottom of the recess surrounding the opening of the insulating jug.

In the case of known insulating jugs with a tubular spout it is already known to provide an additional seal between the top of the housing and a cover embracing the top of the housing, in order to prevent liquid from escaping between the stopper and the upper rim of the housing when the jug is in a steeply inclined pouring position.

Another construction is known in which a pouring channel is provided in the stopper that by-passes the seal and can be closed by a closure member by means of a mechanism that passes through the stopper.

Sealing problems can arise in the constructions described above, first if the sealing surface itself is not flat, and second if different initial and final positions of the seal or the sealing surface result from dimensional discrepancies, which may be additive, whereby the sealing is impaired. The problem arises from the manufacturing technique and depends on the material of the parts, and also occurs with insulating jugs made of plastic. Hitherto elastic, i.e. compressible, sealing elements have been provided to solve this problem. While these allow for compensation of tolerances, they have the disadvantage in terms of handling technique that compression of the sealing element requires the use of a substantial amount of force. In addition the relatively large amount of force used leads to increased wear, which reduces the life of the seal. The problems described above arise in particular in the case of insulating jugs with screw stoppers having set open and closed positions, for example indicated by marks. In one known construction the screw stopper has to be turned through 180° between its open and closed positions so that in the open position the mark is on the side facing towards the spout and in the closed position it is on the opposite side. In the case of this construction this provides another cause of possible dimensional discrepancies.

OBJECT OF THE INVENTION

The object of the invention is to design an insulating jug of the kind described above so that a secure seal can be obtained even when there are relatively great dimensional discrepancies between the sealing parts.

SUMMARY OF THE INVENTION

In the arrangement according to the invention there is no compression of the elastic seal, but in closing a bending pressure is exerted on the sealing lip, under which the sealing lip bends outwards. For this purpose the bending stress of the sealing lip is greater than the forces exerted on the sealing lip by the liquid contained in the jug. This guarantees sealing when the stopper is operated in a convenient way, since all that needs to be applied in closing is the bending stress, which is smaller than the force needed for compression of the sealing element according to the state of the art. Furthermore, with the arrangement according to the invention a large amount of movement of the sealing lip is possible, whereby even large dimensional tolerances can be compensated for without any substantial increase in the bending stress being called for. This latter effect is made possible by the free space into which the sealing lip can be bent.

The bending stress according to the invention also enables the sealing lip to adapt to unevennesses in the sealing surface.

Particularly in the case of an insulating jug in which the closed position is preset by a mark, the arrangement according to the invention also gives the desired sealing precisely at the closed position. In the case of such an arrangement, dimensional discrepancies show up particularly clearly as errors in the position of the screw stopper.

In the case of the arrangement, the above-mentioned free space is provided by the sealing lip extending divergently or convergently at an acute angle w relative to the central axis of the stopper insulating jug. In both cases it is unnecessary to form a special free space, e.g. a recess in the stopper. In the case of a sealing lip that extends radially, such a space is necessary if the sealing lip is not narrower than the sealing element.

In the case of further features of the invention, the sealing lip bears on a facing thrust ring on the stopper on the other side of the sealing element, which contributes to the stabilisation of the seating lip.

According to another aspect of the invention the thrust ring can be formed by a sealing lip, whereby an additional seal against the stopper may also be provided.

It is advantageous to construct the sealing element so that there is no danger of putting it in the wrong way round during assembly.

The construction also facilitates easy insertion or removal of the sealing element. Here the seal to the stopper is effected automatically by the force of reaction on the sealing element as a whole or on the thrust ring. dr The invention will now be explained in more detail with reference to a preferred embodiment shown by way of example in the drawings, in which.

DETAILED DESCRIPTION OF A PREFERRED EMBODIMENT OF THE INVENTION

Figure 1:
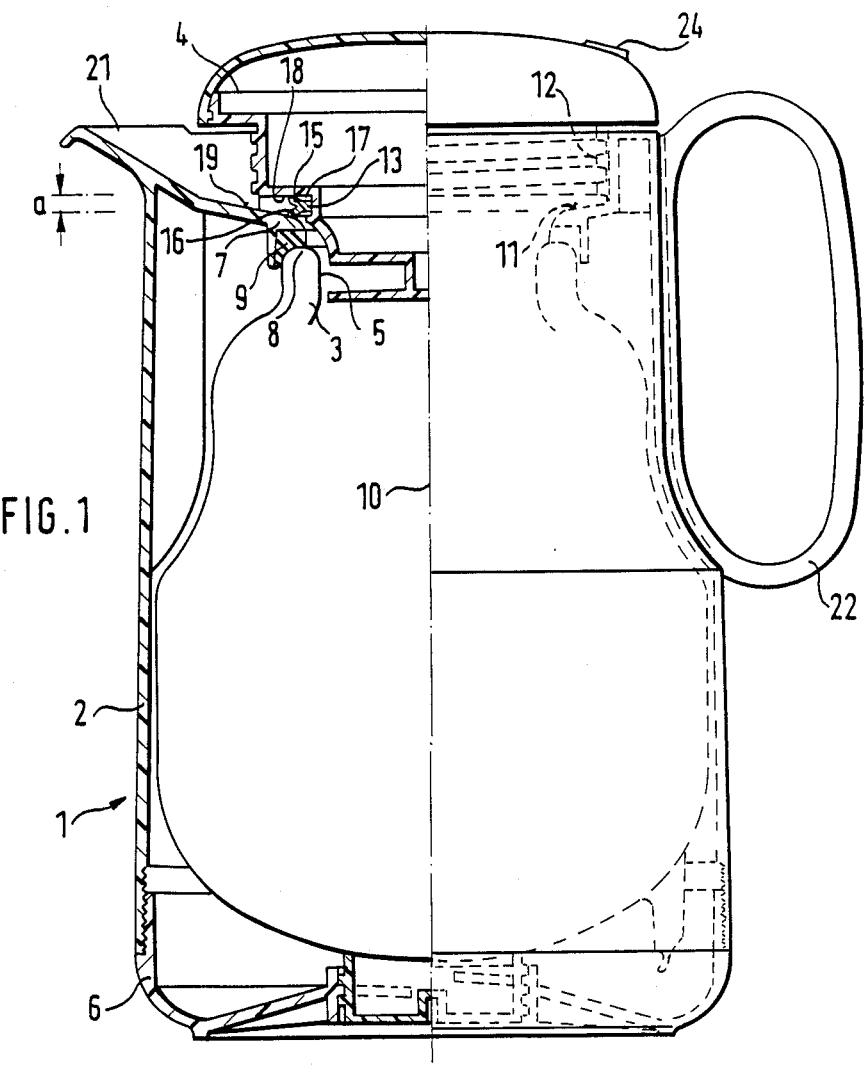
FIG. 1 shows in partial vertical section an insulating jug having a screw stopper and constructed according to the invention.

The insulating jug indicated generally by 1 in FIG. 1 consists of the housing 2, an insulating insert 3 and the screw stopper 4 by means of which the filling opening 5 of the insulating jug 1 can be closed.

The insulating insert 3, which is a double-walled, evacuated glass vessel, is held between a base 6 which can be screwed in and an internal shoulder 7 of the housing 2, a sealing ring 9 being arranged between the rim 8 of the insulating insert 3 and the shoulder 7. The shoulder 7 around the filling opening 5 forms the base of a recess 11 in the housing 2, having a round upper surface and into which the screw stopper 4 can be screwed by means of a screw thread 12.

On the underside of the screw stopper 4 is a Y-section sealing element in the form of a ring, with the stem 14 of the Y facing radially inwards and the two arms which form the sealing lips 15, 16, facing outwards, relative to the central axis 10 of the insulating jug.

The sealing ring 13 is held on the screw stopper by its stem 14 in a circumferential groove 17, so that in the closed portion of the screw stopper 4 shown in FIG. 1 the sealing lip 15 facing the stopper cooperates with a step face 18 on the underside of the screw stopper 4 and the sealing lip 16 facing away from the stopper cooperates with the upper side 19 of the shoulder 7. In the open position of the sealing ring 13, shown in FIG. 3, the sealing lip 16 is at a distance from the upper side 19 of the shoulder 7 indicated by a in FIG. 1, so that an annular gap is provided for pouring out through a spout 21 moulded integrally on the housing and leading laterally out from the recess 11. A handle 22 that is likewise moulded integrally on the housing diametrically opposite to the spout 21 serves for handling the jug.

Figures 2, 3:
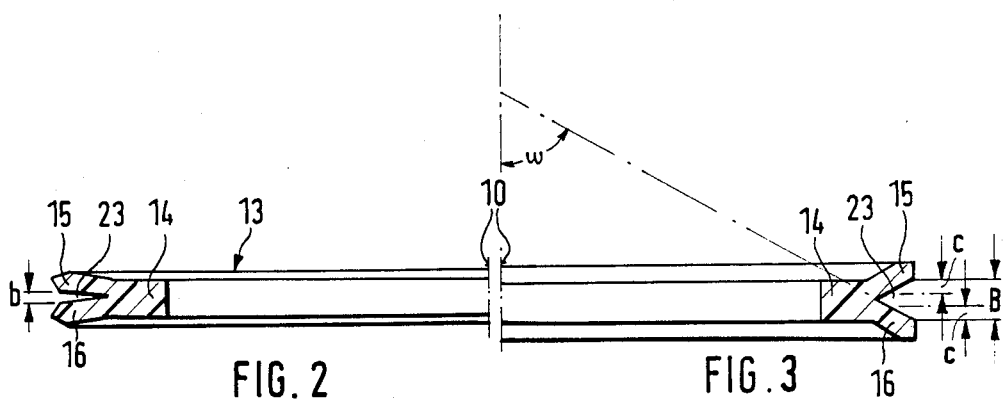
FIGS. 2 and 3 show on a larger scale and in axial section the sealing element acting between the screw stopper and the housing of the insulating jug.

FIG. 2 shows the sectional shape of the sealing ring 13 in the closed position of the screw stopper 4 while in FIG. 3 the sectional shape of the unstressed sealing ring 13 is shown. The free space 23 or distance between the sealing lips 15, 16 allows the sealing lips 15, 16 to bend towards one another. The bending stress of each sealing lip is greater than the force that can be exerted on the sealing lip 16 by the liquid in the insulating insert 3, whereby sealing is ensured irrespective of how far the or each sealing lip 16 is bent inwards. The difference between the greatest distance B and the smallest distance b between the sealing lips 15, 16, which can theoretically be 0, is indicated in FIG. 3 by c. Through the ability of the sealing lips 15, 16 to move, the sealing ring 13 can automatically adapt to relatively large dimensional differences without fear of the seal being impaired. Such dimensional differences can arise both from unevennesses in the upper side 19 and from differences in the distance c of the sealing lip 16 from the reference edges of the housing relative to the closed position of the screw stopper 4, in which a mark 24 in the form of a round raised area is on the side facing the handle 22.

The construction according to the invention also makes for easy handling, since the sealing element does not have to be compressed, as is the case in the prior art.

The sealing ring formed according to the invention is also fully functional when only the sealing lip 16 is present. In this case the seal to the step surface 18 is ensured by the reaction automatically caused on the sealing ring 13.

A further exemplary embodiment of the invention consists in providing a free space on the side of a flat sealing lip facing away from the upper side 19, so that the sealing rim of the sealing lip can bend into this free space when it meets the upper side 19.

It is possible within the scope of the invention to insert the stem 14 of the sealing ring 13 tightly into the circumferential groove, e.g. by glueing or clamping.

A further advantage of the design according to the invention is that when a screw stopper 4 is used, its closed position relative to the housing can be preset without the seal being impaired by normal dimensional variations. This is ensured by the ability of the sealing lips 15, 16 to move.

It is thus also possible to provide the screw stopper, or a stopper having a bayonet closure, with a fixed stop in its closed or also its open position without the risk that the pressure required for a satisfactory seal will not be attained in the case of unfavourable dimensional differences.

In order to compensate for both positive and negative dimensional differences it is recommended that the insulating jug be designed so that in the closed position the sealing ring 13 is in its central position relative to its bending range.

The sealing ring 13 consists of plastic. In addition, in the embodiment described above the housing 2 and the screw stopper 4 also consist of plastic.

What is claimed is:

1. An insulating jug having a stopper, in particular a screw stopper, whose closed position in the circumferential direction is set by a mark or the like and on which there is arranged a sealing element that has a generally radially extending sealing lip that in the closed position lies on a generally radially extending sealing element consisting of a flexible elastic material, characterized in that the flexural bending stress of the material of said sealing lip being greater than the bending stress exerted thereon by pressure of liquid contained in said jug, and that a free space is formed on the side of the sealing lip facing away from the said sealing surface; and a thrust ring being formed on the sealing element on the side of the sealing lip facing away from the sealing surface, said free space extending between the sealing lip and the thrust ring.

2. An insulating jug according to claim 1, characterized in that the sealing lip forms an upwardly or downwardly opening acute angle (w) woth the central axis of the insulating jug.

3. An insulating jug according to claim 1, characterized in that the sealing element has a Y-shaped section with its central stem facing radially inwards, said Y-shaped sections being formed by said sealing lip and said thrust ring.

4. An insulating jug according to claim 3, characterized in that the thrust ring is formed by a second sealing lip on said sealing element extending radially outwardly from said central stem.

5. An insulating jug according to claim 4, characterized in that the sectional shape of the sealing element is symmetrical.

6. An insulating jug according to claim 1, characterised in that the sealing element is held in a circumferential groove in the stopper with play for movement.

7. An insulating jug having a stopper, in particular a screw stopper, whose closed position in the circumferential direction is set by a mark or the like and on which there is arranged a sealing element that has a generally radially extending sealing lip that in the closed position lies on a generally radially extending sealing surface on the housing of the insulating jug, said sealing element consisting of a flexible elastic material, characterized in that the flexural bending stress of the material of said sealing lip is greater than the bending stress exerted thereon by pressure of the contained liquid, and that a free space is arranged on the side of the sealing lip facing away from the said sealing lip formed thereon on the side of the sealing lip constituting a thrust ring contacting the screw stopper.

* * * * *

UNITED STATES PATENT AND TRADEMARK OFFICE
CERTIFICATE OF CORRECTION

PATENT NO. : 4,768,664

DATED : September 6, 1988

INVENTOR(S) : Anso Zimmermann

It is certified that error appears in the above-identified patent and that said Letters Patent is hereby corrected as shown below:

In the Abstract, line 4, "extedning" should read --extending--.

Column 2, line 47, "ring. dr" should read -- ring.--.

Column 4, lines 65 to 67, delete "sealing lip formed........ screw stopper" and insert -- sealing surface, the sealing element having a second sealing lip formed thereon on the side of the sealing lip facing away from the sealing surface, said free space being located between the sealing lips, said second sealing lip constituting a thrust ring contacting the screw stopper.--.

Signed and Sealed this

Seventh Day of November, 1989

*Attest:*

JEFFREY M. SAMUELS

*Attesting Officer*  *Acting Commissioner of Patents and Trademarks*